(12) United States Patent
Dowell

(10) Patent No.: US 7,766,562 B2
(45) Date of Patent: Aug. 3, 2010

(54) SUPPORT CRADLE AND STRAP FOR LARGE CAMERA LENS

(76) Inventor: Michael Dowell, 401 Downing Court # B, Lexington, KY (US) 40517

( * ) Notice: Subject to any disclaimer, the term of this patent is extended or adjusted under 35 U.S.C. 154(b) by 335 days.

(21) Appl. No.: 11/824,081

(22) Filed: Jun. 29, 2007

(65) Prior Publication Data

US 2008/0013194 A1    Jan. 17, 2008

Related U.S. Application Data

(60) Provisional application No. 60/830,460, filed on Jul. 13, 2006.

(51) Int. Cl.
*G03B 17/00* (2006.01)
(52) U.S. Cl. .................... 396/423; 396/422; 348/375; 359/815
(58) Field of Classification Search .................. 396/423
See application file for complete search history.

(56) References Cited

U.S. PATENT DOCUMENTS

| 3,608,794 | A | * | 9/1971 | Mazure | 224/255 |
|---|---|---|---|---|---|
| D234,442 | S | * | 3/1975 | Mazur | D16/243 |
| 3,870,209 | A | * | 3/1975 | Mazur | 224/255 |
| 4,187,020 | A | * | 2/1980 | Ishii et al. | 396/144 |
| 4,473,177 | A | * | 9/1984 | Parandes | 224/191 |
| 4,566,768 | A | | 1/1986 | Bosdet | |
| 5,160,956 | A | | 11/1992 | Watanabe et al. | |
| 5,555,134 | A | | 9/1996 | Hanke et al. | |
| 5,812,887 | A | | 9/1998 | Nomura et al. | |
| 6,002,886 | A | | 12/1999 | Tamura | |
| 6,164,843 | A | | 12/2000 | Battacchio | |
| 6,741,401 | B2 | | 5/2004 | Nomura et al. | |
| 6,791,769 | B2 | | 9/2004 | Takeda | |
| 6,895,180 | B2 | | 5/2005 | Artonne et al. | |
| 2006/0055821 | A1 | * | 3/2006 | Sousa | 348/375 |
| 2006/0268156 | A1 | * | 11/2006 | Gale | 348/373 |

* cited by examiner

*Primary Examiner*—Melissa J Koval
*Assistant Examiner*—Bret Adams
(74) *Attorney, Agent, or Firm*—Michael Coblenz

(57) ABSTRACT

A lens support system for stabilizing and securing a large camera lens when it is attached to a camera is disclosed. The lens support system consists of a lens cradle that is attached to the tripod mount of a large camera lens, and a neck strap attached to the lens cradle that will be worn around the photographer's neck. The lens support system can also be used to secure a lens when unattached to a camera, and can be used as a balanced hand-hold without the neck strap.

10 Claims, 4 Drawing Sheets

SUPPORT CRADLE AND STRAP FOR LARGE CAMERA LENS

CROSS REFERENCE TO RELATED APPLICATIONS

This application claims priority to U.S. provisional application Ser. No. 60/830,460, filed on Jul. 13, 2006 and incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a support system that allows a photographer to easily secure, stabilize and carry large camera lenses while both attached and unattached to the camera body.

2. Description of the Related Art

Many photographers carry large specialty camera lenses, such as zoom, prime, macro and telephoto lenses, when they are taking pictures. The large lenses generally have a tripod mount built into them. Such lenses and tripod mounts are well known in the field of photography. These lenses provide the photographer the ability to take a variety of specialty photographs, and are frequently used by news photographers, sports photographers, wild life photographers, and fashion photographers. Some of these lenses, like large telephoto lenses, can be over one foot in length, and can weigh over four pounds.

Standard cameras have a neck strap connected to the body of the camera. When a standard lens is attached to the camera body the standard neck strap is sufficient to carry the camera. However, when a large lens is attached to the camera, it shifts the center of gravity of the camera and attached lens forward, and with a standard neck strap connected only to the body of the camera, the lens tends to droop forward and down.

There are a number of problems associated with the drooping of large camera lenses while attached to the camera body. First it causes twisting on the camera neck strap, which can cause strain on the wearer's neck and in some cases actually cut into the neck. This is can obviously be uncomfortable, but is also tiring if the photographer is wearing the camera for extended periods of time. Another problem is that with some of the larger lenses, the lens can droop so far forward that it will bounce on the photographer's stomach, which is irritating and uncomfortable. This sagging or drooping of the lens can also cause twisting and strain on the camera body and lens mounting mechanisms which connect the lens to the body. This is a significant problem given the cost of both camera bodies and lenses. To prevent the lens from drooping, photographers must use a hand to steady the camera in place. This is not only inconvenient, since it prevents use of the hand, but can also be tiring over extended photo shoots.

Another problem is that with some types of large lenses the camera can go out of focus if the lens droops. This is particularly true for camera lenses with push pull type focus, such as the Sigma "Bigma" 50-500 mm or the Canon 100-400 mm. When the lens is pointing down, gravity can change the position of the focus ring, thus taking the lens out of focus. In some cases the focus ring can move down rapidly or violently and potentially cause damage to the lens. There is a need, therefore, for a system that can attach to large camera lenses to prevent the shifting and drooping of the lens and the twisting of the camera neck strap.

Many photographers carry multiple lenses when they are in the field taking pictures. Lenses are often transported in carrying cases, some similar to small suitcases, that are designed to protect the lenses. But these carrying cases are not convenient to carry in difficult terrain or in crowds. These cases also require the photographer to use one hand to carry the case. It is also inconvenient and time consuming to remove a lens from the camera and exchange it for a lens from the carrying case. There is a need, therefore, for a convenient way to carry individual lenses in order to make it easier and faster to change lenses.

Another common problem is that when photographers are outside taking photographs they often encounter adverse environmental conditions, like moister, dust, dirt or sand, that can damage the lens if the camera is set on the ground. This occurs because the camera with a large lens will tend to tip forward, placing the lens directly onto the ground or other surface. This can potentially damage the lens. Since some lenses can cost many thousands of dollars, there is a need to keep the lens from direct contact with a surface when the camera and lens is set down.

SUMMARY OF THE INVENTION

This invention provides a support system for large camera lenses comprising a lens cradle and a neck strap. The lens cradle mounts to the lens tripod mount which is located on the bottom of most large lens. The lens cradle is sized to be just wider than the standard large camera lens, and has beveled ends with a slot opening to attach the neck strap. When the photographer is carrying the camera with the camera's neck strap and the lens with the lens support system disclosed herein, the lens support system prevents the lens from drooping forward, thus preventing twisting of the camera neck strap. The lens cradle further provides a small pedestal to keep the lens from touching the surface when the camera with attached lens is set down. Finally, the lens support system allows lenses to be conveniently carried individually.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
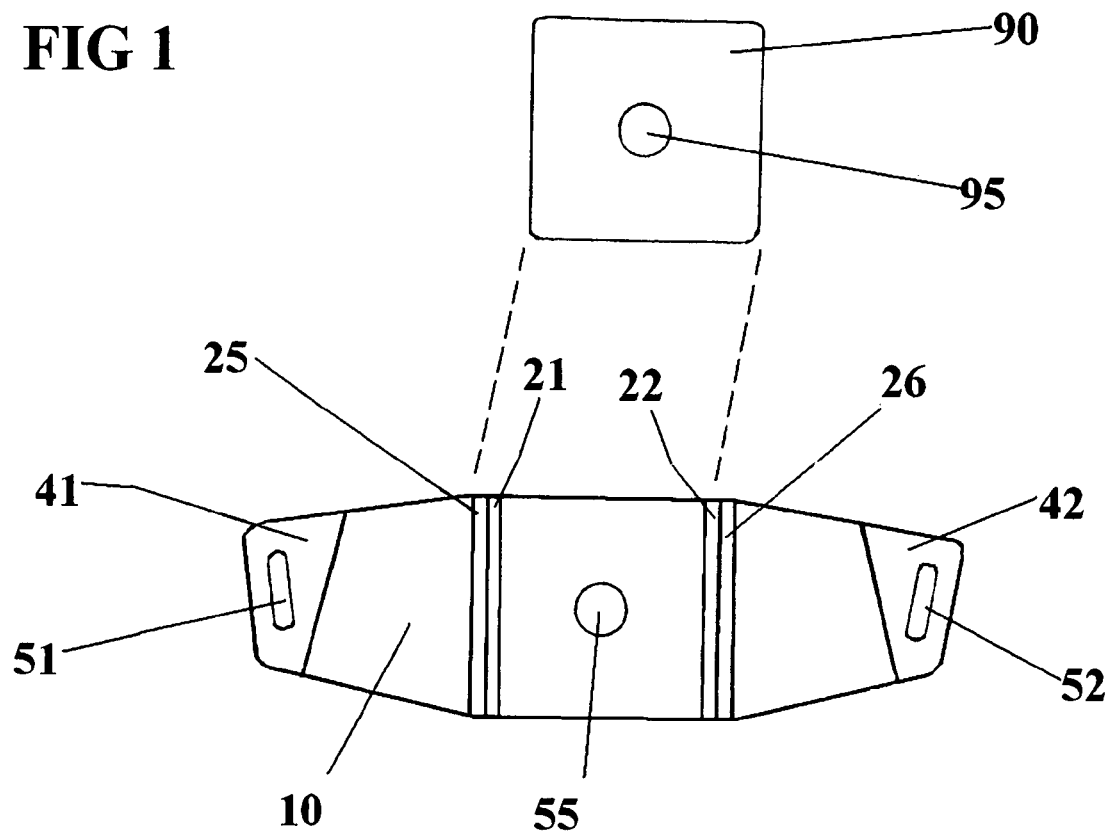
FIG. 1 is a partially exploded plan view showing the lens cradle and pad portions of the disclosed invention.
Figure 2:
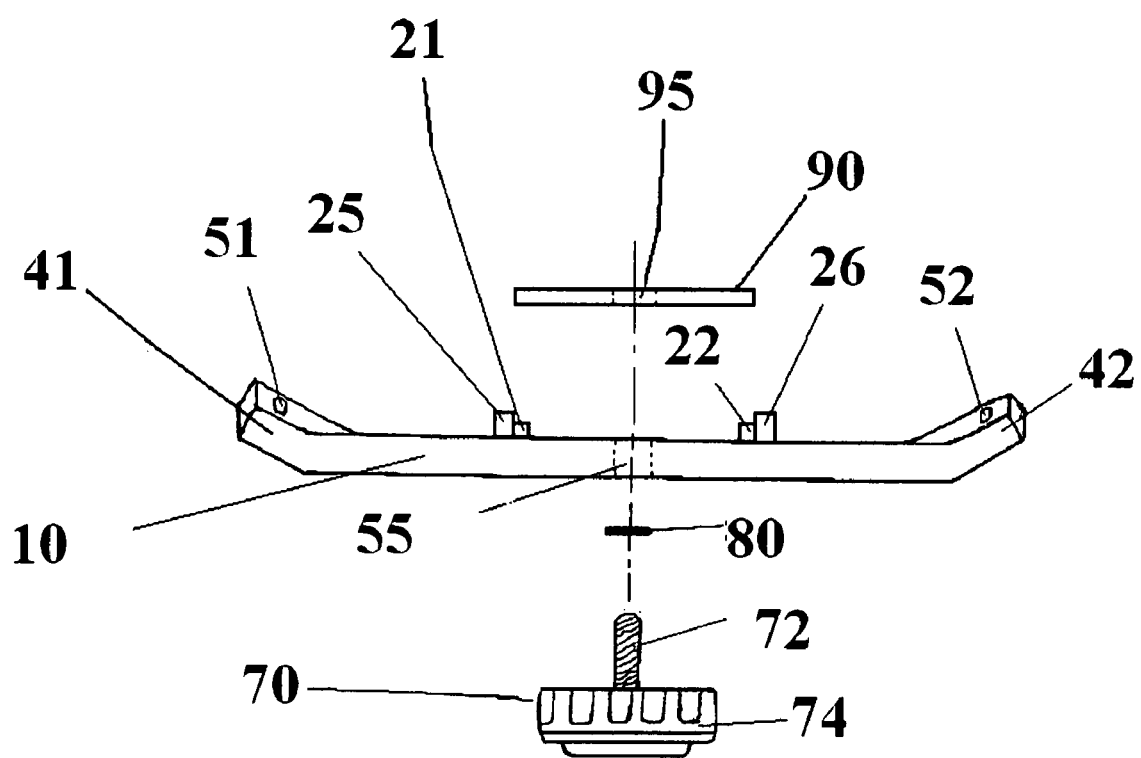
FIG. 2 is a partially exploded front elevation view showing the major components of the disclosed invention.
Figure 3:
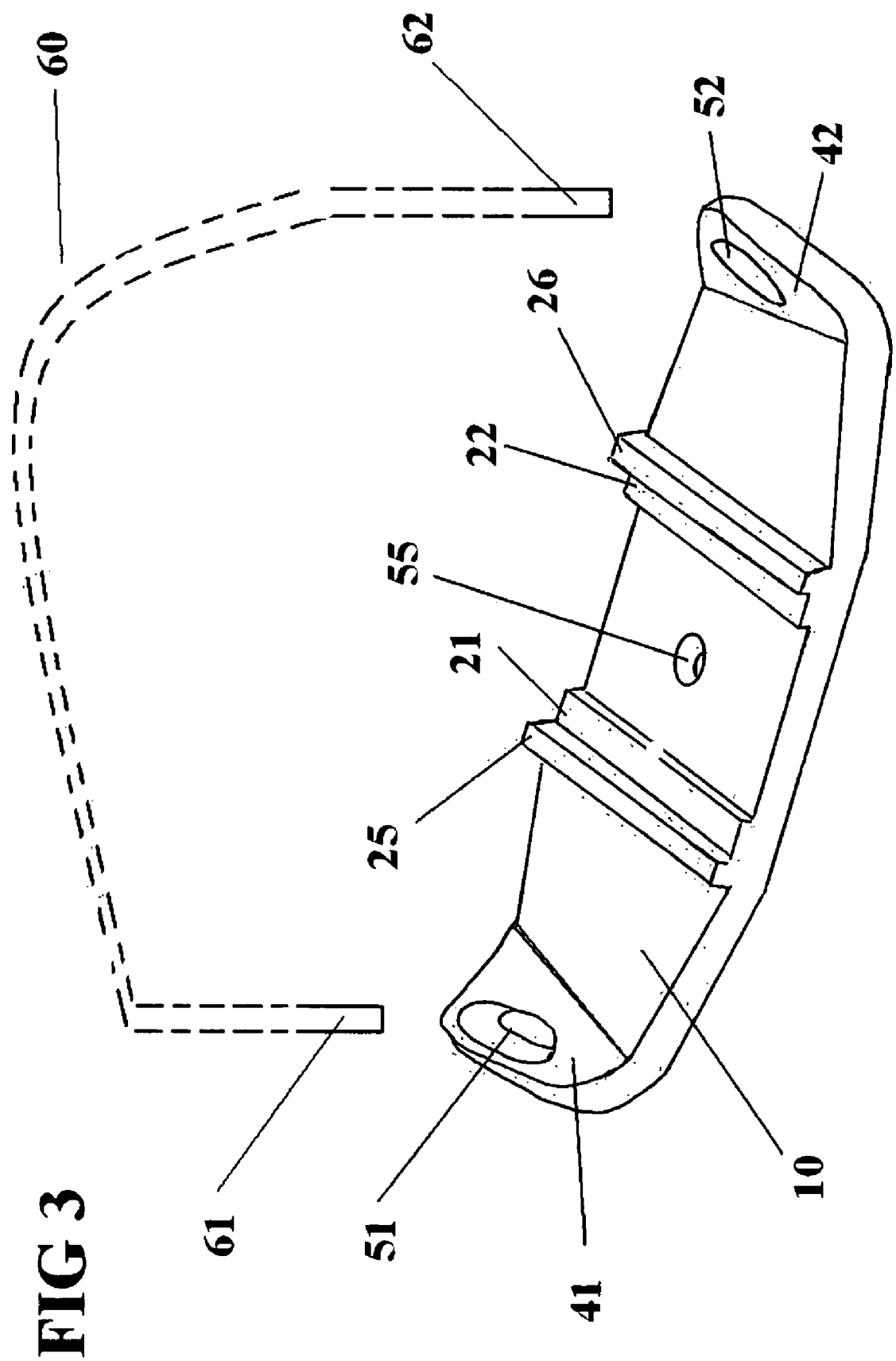
FIG. 3 is a perspective view of the lens cradle portion of the invention.

The lens support system is shown in detail in FIGS. 1, 2 & 3. The lens cradle 10 is approximately four and a half (4½") to five (5") inches in wide, approximately one-quarter (¼") inch thick, and approximately one and one half inches (1½") deep. In other embodiments, the lens cradle 10 could be up to seven inches wide to accommodate extremely large camera lenses. The lens cradle 10 could be slightly shorter, though that would potentially result in the neck strap interfering with the lens, but could not be shorter than two inches long.

In the preferred embodiment the lens cradle 10 is made from polycarbonate or ABS (acrylonitrile butadiene styrene) plastic. The lens cradle 10 is formed by injecting the polycarbonate or ABS plastic into a mold. In alternate embodiments the lens cradle 10 could be made from any moldable material, including but not limited to, poly carbonates, aluminum, metal alloy, plastic, plastic composites, or resin based materials. The lens cradle 10 can conceivably be made of any suitably strong or durable material. In the most preferred embodiment the lens cradle 10 is molded into shape, but it is within the conception of the invention to shape the lens cradle 10 by cutting or stamping into shape.

In the most preferred embodiment of the invention, the lens cradle 10 is black in color. Camera bodies are typically black, and lenses generally come in black, white, or silver. Camera accessories are typically black, and the lens cradle 10 is black to match other camera accessories. In an alternate embodiments the lens cradle 10 is grey. It is possible, and within the conception of the invention, that the lens cradle could be made in any color of the visible spectrum.

As can be seen by reference to FIGS. 1, 2 and 3, the lens cradle 10 has a top 20 and a bottom 30. There are two strap slots 51 & 52 at either end of the lens cradle 10. In the preferred embodiment the lens cradle 10 has beveled ends 41 & 42. As shown with more particularity in FIG. 2, in the most preferred embodiment the beveled ends 40 & 41 are angled up from the top 20 of the lens cradle at approximately 45 degrees. It is within the conception of the invention that the beveled ends 41 & 42 can be angled from the top 20 of the lens cradle 10 from between zero (or essentially horizontal with the rest of the lens cradle 10) and ninety degrees (or at essentially a right angle from the top 20). The beveled ends 41 and 42 curve up slightly on the sides of the lens, thus "cradling" the camera lens.

The strap slots 51 and 52 are holes running through the beveled ends 41 and 42 of the lens cradle 10, such that the first strap slot 51 is within the first beveled end 41 and the second strap slot 52 is within the second beveled end 42. The strap slots 51 & 52 are approximately one half inch (½") wide and are sized to accommodate the neck strap 60.

A center hole 55, located in the center of the lens cradle 10, runs through the lens cradle 10 from the bottom 30 to the top 20. In the preferred embodiment the center hole 55 is just slightly larger than three-eighths (⅜") of an inch in diameter. As will be described below, the diameter of the center hole 55 is sized to accommodate the screw 72 portion of the thumb screw 70.

Spaced evenly on the top 20 of the lens cradle 10, and on either side of the center hole 55 are two groups of guide rails. The inside guide rails 21 and 22 are approximately one inch (1") apart, and the outside guide rails 25 and 26 are approximately one and one half inches (1½") apart. The width of these guide rails 21 & 22 and 25 & 26 are to accommodate the width of a tripod mount 110. Tripod mounts 110 can vary from three-quarter inch (¾") to two inches (2"), but the most common widths are one inch (1") and one and one half inch (1½"). The guide rails 21 & 22 and 25 & 26 are to hold the lens cradle 10 in proper alignment when attached to the tripod mount 110. Details on attaching the lens cradle 10 to the tripod mount 110 will be disclosed below.

FIG. 3 provides detail on the neck strap 60. The neck strap 60 can be any type of commonly used strap for holding a camera around a user's neck. There are many sizes and varieties that are well known in the field of photography. The only requirement for the neck strap 60 is that the ends are approximately three-eights (⅜") wide. Typically, neck straps 60 are approximately fifty inches (50") long, but can be longer for taller users. The neck strap 60 has first end 61 and a second end 62, which are sized to fit within the first and second strap slots 51 and 52. The first end 61 of the neck strap 60 is inserted through the first strap slot 51 of the lens cradle 10, and the second end 62 is inserted through the second strap slot 52. The first and second ends 61 and 62 are then secured against the strap 60 in any means commonly used in the art, to include clipping or tying. In the preferred embodiment the ends 61 and 62 are secured by means of grommets 63 & 64 (not shown).

Thumb screw 70 consists of a knob 74 and a screw 72. The screw 72 is a standard ⅜" machine screw. This is the standard size screw used in tripod mounts. The size of the screw 72 and the guide rails 21 & 22 and 25 & 26 allow the lens cradle 10 to accommodate lenses made by a variety of major manufacturers, including, but not limited to, Canon, Nikon, Sigma, Pentax, Tokina, Tameron, Minolta and Olympus. The guide rails 21 & 22 and 25 & 26 hold the tripod mount straight against the top 20 of the lens cradle 10, and prevent the tripod mount 110 from twisting when attached to the lens cradle 10. As can be appreciated, the narrower width tripod mount 110 will fit within the inside guide rails 21 & 22, and a wider tripod mount 110 will fit within the outside guide rails 25 & 26.

As can be seen in FIG. 2, there is a compression ring 80, through which the screw 72 is inserted. The compression ring 80 is sized to fit securely around the screw 72 and can be made from any commonly used soft but durable material, including rubber or soft plastic.

There is a pad 90, which is sized to fit snuggly within the two outside guide rails 25 and 26 on the top 20 of the lens cradle 10. The pad 90 is essentially the same depth as the lens cradle 10, which in the preferred embodiment is approximately one and one half inches (1½") deep. The pad 90 can be made from any suitably soft but durable material, including cork or leather, but in the preferred embodiment is neoprene. The pad 90 is approximately one sixteenth to one eighth of an inch (1/16" to ⅛") thick. The pad 90 is sized to fitting snuggly between the outside guide rails 25 and 26. In alternate embodiments, the pad 90 can be attached to the top 20 of the lens cradle 10 by any conventional means, including gluing. There is a hole 95 in the center of the pad 90. The hole 95 is approximately ⅜" in diameter. When attached to the lens cradle 10, the hole 95 of the pad 90 will align with the center hole 55 of the lens cradle 10. In one embodiment, the hole 95 is sized so that the screw 72 will thread into the material of the pad 90, thus holding the thumb screw 70 in place against the bottom 30 of the lens cradle 10. In alternate embodiments a small c-clip (not shown) is provided between the lens cradle 10 and the pad 90 to hold the thumb screw 70 in place.

Figure 4:
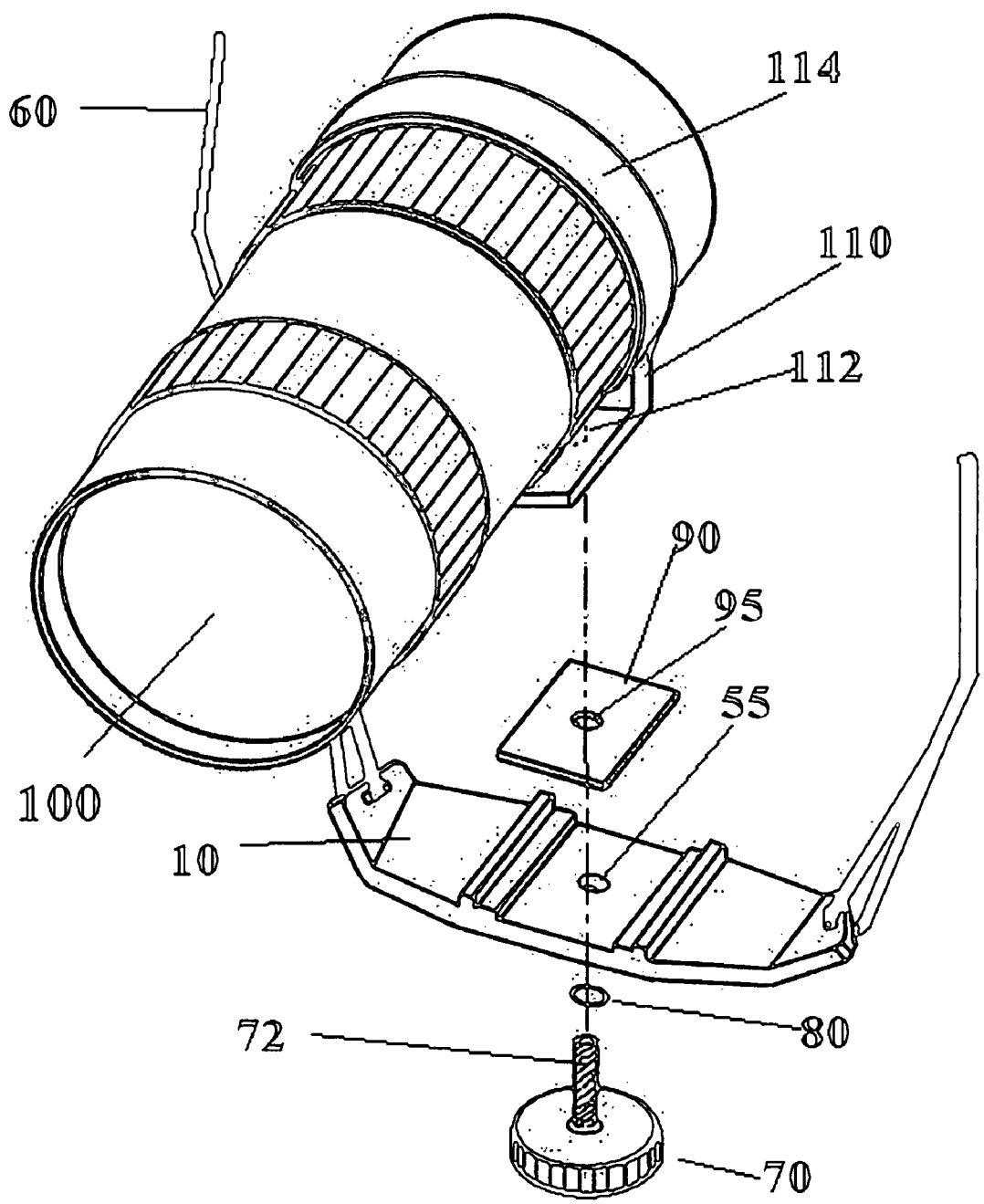
FIG. 4 is a partially exploded perspective view depicting the invention and components of a camera lens.

As depicted in FIG. 4, most large lenses 100 have a tripod mount 110. The tripod mount 110 is attached to the large lens 100 by means of a tripod mount collar 114 that is secured around the large lens 100. The tripod mount 110 has a mounting nut 112 on the underside of the tripod mount 110. The tripod mount nut 112 allows the tripod mount 110 to be attached to standard tripods, or other camera and lens mounting or supporting devices. It is standard in the photographic equipment industry for tripods and other mounts to use a ⅜" screw. The tripod mount nut 112 is sized to fit these standard screws. The screw 72 of the thumb screw 70 is the standard ⅜" industry size and will fit the tripod mounting nut 112 of all major brands of camera lenses.

Turning now to FIG. 4, the lens cradle 10 will be attached to the tripod mount 100. The screw 72 of the thumb screw 70 is inserted through the compression ring 80, the center hole 55 of the lens cradle 10, the hole 95 of the pad 90, and then threaded into the mounting nut 112 of the tripod mount 110. The lens cradle 10 is secured to the tripod mount 110 by screwing the thumb screw 70 in to place in the mounting nut 112. The compression ring 80 prevents the thumb screw 70 from being screwed in too tightly, thus preventing damage to the lens cradle 10 or the tripod mount 110.

Large lenses 100 are designed so that the tripod mount 110 is at the center of gravity of the combined camera and lens. This is so that the camera will not shift or twist when mounted on a tripod. With the lens cradle 10 connected to the tripod mount 110 as described above, the lens cradle 10 is at the center of gravity of the combined camera and lens. When holding the neck strap 60 with the camera body and lens off the ground, the camera will stay essentially horizontal. As a result, when the neck strap 60 is worn around the neck, the camera lens will not droop.

When a large lens 100 is mounted on the lens cradle 10, and the lens is also attached to the camera, the photographer will have two neck straps to place around the neck, one for the camera and one for the lens support system. With the adjustment of the two neck straps the photographer can carry the camera and lens together in a horizontal position, because the lens support system prevents the lens from pulling the camera forward and down. Because the lens cradle 10 will be attached to the new center of gravity of the combined camera and barrel lens 100 is it possible for the user to carry the camera and lens with only the disclosed lens support system.

An additional feature of the lens support system is that it allows a user to conveniently carry additional lenses. When a large lens 100 is mounted on the lens cradle 10 but not attached to the camera body, the photographer can carry the lens around his neck. In this way the lens can be transported separate from the camera. The configuration of the beveled ends 41 & 42 of the lens cradle 10 allows the photographer to conveniently carry the lens in a vertical position. This allows the photographer to conveniently carry the lens against the body, or even under an arm. This will conveniently allow the photographer to carry extra lenses to meet the needs of the particular assignment or photo-shoot.

If the photographer is carrying multiple lenses, each with separate lens support system, all of the required lenses will be around the photographer's neck. The photographer can switch lenses on and off the camera with ease because there is no need to set a lens down after detaching it from the camera. All that is required is for one lens to be detached from the camera. That lens will simply remain attached around the photographer's neck, and the alternate lens can then be put in place and attached to the camera.

The lens cradle 10 also acts as a convenient hand hold. Typically, when a photographer lifts the camera with a large lens 100 to take a picture he or she has to hold the lens to provide support. This is generally not a problems initially since the photographer will also be manipulating the focus ring of the lens. But once the camera is focused, holding the ring can result in altering the camera focus. The lens cradle 10 provides a convenient and well balanced place to hold the lens.

The use of the lens cradle 10 as a hand-hold is particularly important when taking portraits. Most portraits are taken with the camera turned 90 degrees. Most tripod mounts 110 are adjustable by means of the tripod mount collar 114, and most tripod mount collars 114 can be rotated around the barrel lens 100. By rotating the tripod mount collar 114 ninety degrees, the lens cradle 10 can be used as a convenient hand hold for holding the lens 100 during portrait photography.

The tripod collar mount 114 can also be rotated 180 degrees, thus placing the lens cradle 10 on top of the lens 100. This will allow the photographer to hold the lens 100 on top, and will also allow the photographer to use the strap 60 as an alternate method of securing the camera. In some situations the photographer will secure the camera against common objects such as tree limbs. With the tripod collar mount 114 on the top of the lens 100, the photographer can secure the neck strap 60 around a branch or other object, thus securing the camera off his or her body. This will not only allow the photographer to safely secure the camera, but can also be used as an alternate method of securing the camera for obtaining particular photographs.

An additional feature of the lens support system is that it will protect the lens when the lens and camera combination is set down on a horizontal surface. In the normal configuration (without the lens support system) when the camera and lens combination is set down, the weight of the lens tips the combination forward, resulting in the front of the lens resting on the ground. This can cause damage to the lens. With the lens cradle 10 attached under the large lens 100, the lens will rest on the knob 74 of the thumb screw 70, and the front of the lens will not touch the ground.

The lens cradle 10 can also be mounted between the large lens 100 and a common tripod or monopod (not show). Tripods and monopods are well known in photography. This can be accomplished by providing a screw 72 of sufficient length to run through the tripod quick release plate and the lens cradle 10 and attach to the tripod mount 110.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A lens support system for supporting a large camera lens with a tripod mount comprising:
    a lens cradle having a set of guide rails to securely hold said tripod mount against said lens cradle,
    said lens cradle having beveled ends with slots integrated therein,
    a neck strap attached to said lens cradle through said slots, wherein said neck strap is worn by a camera user, and
    a means for attaching said lens cradle to the tripod mount of the large camera lens.

2. The lens support system of claim 1 wherein said lens cradle contains a hole located in the center of said lens cradle, and wherein said means for attaching said lens cradle to the tripod mount comprises a thumb screw having a knob end and a screw end, said screw end inserted through said hole in said lens cradle and threadably attached to a mounting nut on the tripod mount of the large camera lens.

3. The lens support system of claim 2 further comprising a compression ring attached to the screw end of said thumb screw, and wherein said compression ring provides a cushion between said knob end and said lens cradle.

4. The lens support system of claim 3 further comprising a pad, said pad sized to fit within said guide rails, said pad having a hole therein, said hole in said pad aligned with said hole in said lens cradle, wherein said pad provides a cushion to prevent damage to the tripod mount when said lens cradle is attached to the tripod mount.

5. An apparatus for supporting a large camera lens with a tripod mount that is attached to a camera and worn by a user comprising:
  a lens cradle having a center hole therein and a first beveled end and a second beveled end, said first end having a first strap slot therein, and said second end having a second strap slot therein;
  a set of guide rails mounted on said lens cradle equal distant from said center hole in said lens cradle, wherein said guide rails prevent twisting of the tripod mount when connected to said lens cradle;
  a pad having a hole therein, said hole in said pad aligned with said center hole of said lens cradle;
  a neck strap having a first end and a second end, said first end of said neck strap threaded through said first strap slot of said lens cradle and said second end of said neck strap threaded through said second strap slot of said lens cradle;
  a thumb screw having a screw and a knob, said screw inserted through said center hole of said lens cradle and said hole in said pad and threadably attached to the tripod mount of the large camera lens.

6. The apparatus for supporting a large camera lens with a tripod mount of claim 5 further comprising a compression ring positioned on said screw of said thumb screw before said screw is inserted through said center hole of said lens cradle, wherein said compression ring cushions said lens cradle from said thumb screw.

7. A method for stabilizing and securing a camera with a large lens having a tripod mount around a user's neck, comprising the steps of:
  providing a lens cradle;
  providing a set of guide rails on said lens cradle to secure said tripod mount and prevent said tripod mount from twisting when attached to said lens cradle;
  providing said lens cradle with a first beveled end and a second beveled end;
  inserting a first slot into said first beveled end and a second slot into said second beveled end;
  providing said neck strap with a first end and a second end,
  threading said first end of said neck strap through said first slot and threading said second end of said neck strap through said second slot;
  attaching said lens cradle to the tripod mount of the large camera lens;
  securing said neck strap around the user's neck.

8. The method for stabilizing and securing a camera with a large lens having a tripod mount of claim 7 comprising the further step of:
  disposing a pad on said lens cradle, wherein said pad provides a cushion for said tripod mount.

9. The method for stabilizing and securing a camera with a large lens having a tripod mount of claim 8 comprising the further steps of:
  inserting a thumb screw through a hole is said lens cradle; and
  threading said thumb screw into a mounting nut on the tripod mount.

10. The method for stabilizing and securing a camera with a large lens having a tripod mount of claim 9 comprising the further step of:
  disposing a compression ring on said thumb screw to act as a cushion between said thumb screw and said lens cradle.

* * * * *